INVENTORS
BENTH PREBEN HANSEN
SAUL BLITZ

BY Nolte & Nolte

ATTORNEYS

INVENTORS
BENTH PREBEN HANSEN
SAUL BLITZ

BY Nolte & Nolte

ATTORNEYS

United States Patent Office 3,579,725
Patented May 25, 1971

3,579,725
MACHINE FOR PRODUCING HOLLOW ARTICLES
Benth Preben Hansen, Glostrup, Denmark, and Saul Blitz, New York, N.Y., assignors to T.W. Manufacturing Company, Inc., New York, N.Y.
Filed May 15, 1968, Ser. No. 729,224
Claims priority, application Denmark, Oct. 13, 1967, 5,080/67
Int. Cl. B29d 23/03
U.S. Cl. 18—5      3 Claims

ABSTRACT OF THE DISCLOSURE

A method of molding and subsequently blow molding plastic parts in suitable molds by retaining the parts, after molding, on cores which are subsequently moved together with the parts to a position from which they are inserted into the respective blow molds for the blow molding operation and a molding machine for performing the method according to the invention. The molding machine has moving means for moving the cores between a position in which they cooperate with the injection molding means and a position in which they cooperate with the blow molding means of the machine.

---

Figure 1:
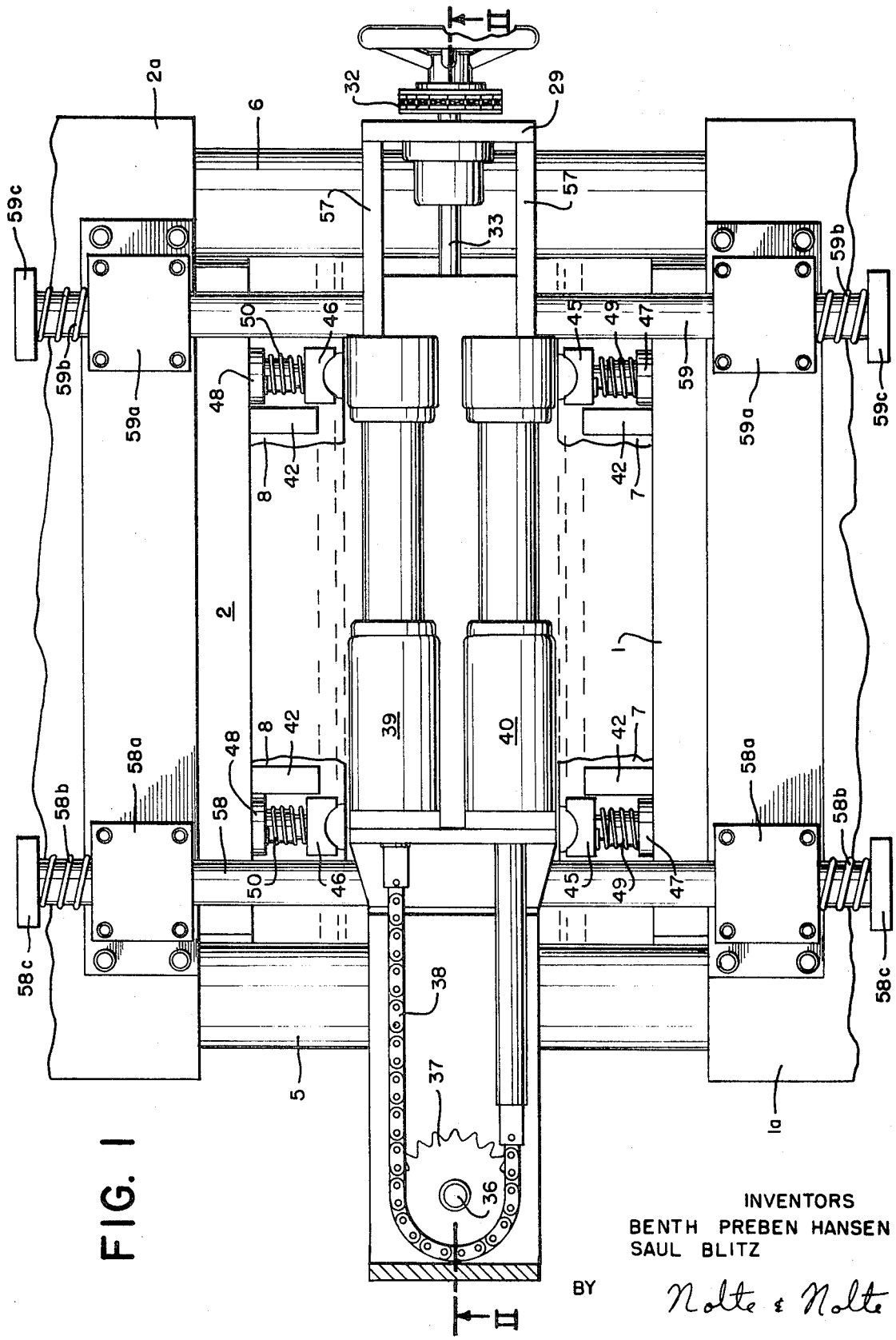

The invention relates to a method for producing hollow articles, preferably of thermo-plastic material, and of the kind, wherein firstly an object in injection moulded in an injection mould having a core, whereafter the injection mould is opened, and the object, fixedly situated on the core, is transferred to a blow-mould, where a blowing is carried out for distending the injection molded object, so as to abut the wall of the blow-mould, and wherein the parts of the injection mould and the blow-mould are placed on two mounting plates that can be moved towards each other for closing the moulds.

It is the object of the invention to provide a method of the stated kind, whereby by means of a machine with given dimensions, especially with given dimensions of the mounting plates, a large production may be obtained. This is achieved according to the invention by the fact, that one or more pairs of cores are moved in a closed path at right angles to the mounting plates in such a way that one core of each pair is introduced into an injection mould, while the other core of each pair is introduced into a blow-mould. It is relatively easy to provide for the stated movement of the cores, and it is obtained that the injection moulding in the injection mould is carried out simultaneously with the blowing in the blow-mould, and so on. The closed path may be of different shapes, for instance circular, but as a rule it will be most advantageous that the two cores are moved during the largest part of the movement in linear paths parallel to each other and to the mounting plates at a relatively small distance from each other, whereby it is obtained that the movement of the mounting plates can be relatively small. Also it will be advantageous that the last part of the movement takes place with a relatively small velocity in lateral direction, so that the side-swing movement of the cores is avoided. The method can easily be adapted to be carried out on a conventional injection moulding machine by mounting the necessary components. However, as such a conventional injection moulding machine includes a number of components and can carry out a number of operations that are not necessary for the method in question, it can be advantageous to construct a machine especially for the method.

Furthermore, the invention relates to a machine for carrying out the method, and in this connection it should be remembered, that the method may be carried out by means of a conventional injection moulding machine, whereupon there are arranged special means, and from this aspect the invention relates to these means for being mounted upon an injection moulding machine. The machine includes two mounting plates, whereupon mould parts can be mounted, said parts being closed by movement of the mounting plates towards each other, and it should be noted, that as a rule only one mounting plate is movable, while the other is stationary. The characteristic for the machine according to the invention is that the cores are placed in rows upon two bar-like members which extend parallel to the mounting plates and have a closed path. Corresponding hereto the injection mould parts are placed in a row aligned with each other on the mounting plates, and the blow-mould parts are likewise placed in a row on the mounting plates, the two rows being parallel. The cores are moved one half a turn of the path at a time and are stopped in the positions, where the one row of cores is aligned with the injection moulds and the other row of cores is aligned with the blow-moulds, whereafter the moulds are closed, and injection moulding and blow-moulding are carried out, whereafter the moulds are opened, the blow-moulded objects are removed from the corresponding cores, and the cores again are moved a half turn of the path and stopped, and so on.

The machine according to the invention may be constructed in such a way, that the two bar-like members are secured to two chains that each run on two sprocket wheels, and that the machine has a driving mechanism for moving the bar-like members one half turn of the path at a time, said movement being synchronized with the movement of the mounting plates in such a way, that the bar-like members are stopped in their movement, when the mounting plates and herewith the mould parts are moved towards each other. The two chains are placed at either end of the two bar-like members. Hereby a simple and practical construction is achieved. The two sprocket wheels have such a relatively small diameter that the bar-like members and the cores placed thereon with security just can go free of each other when passing each other.

In a machine, the mounting plates are vertical and their movement is horizontal, the arrangement may be in such a way, that the path of movement of the cores is vertical, and that the cores are placed hanging vertically downwards on the bar-like members. Hereby a simple and practical construction is achieved. It should be noted, that the bars and therefore the cores are placed freely swingable on the chains, so that they maintain their vertical position. However, it is not out of the question to use a mechanism, wherein the bars and therefore the cores are guided during the whole of their movement, but such a mechanism will usually be relatively complicated.

The mounting plates may have means for locking the bar-like members and the cores in the precise position before the closing of the moulds. It is hereby ensured that the cores obtain the correct position in the moulds, so that accurate hollow articles are produced.

In the accompanying drawings are shown essential portions of the machine according to the invention.

Figure 2:
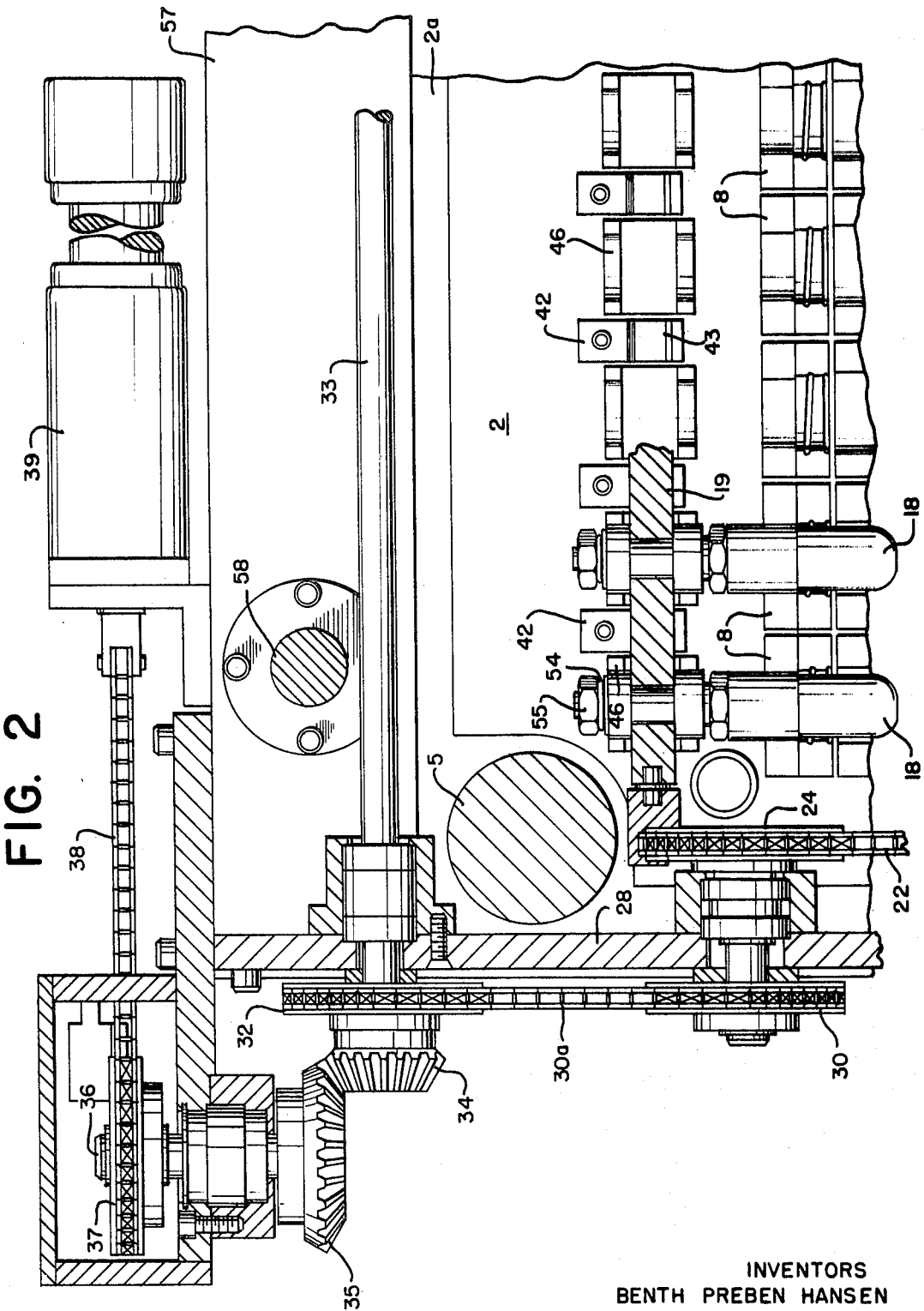
Figure 3:
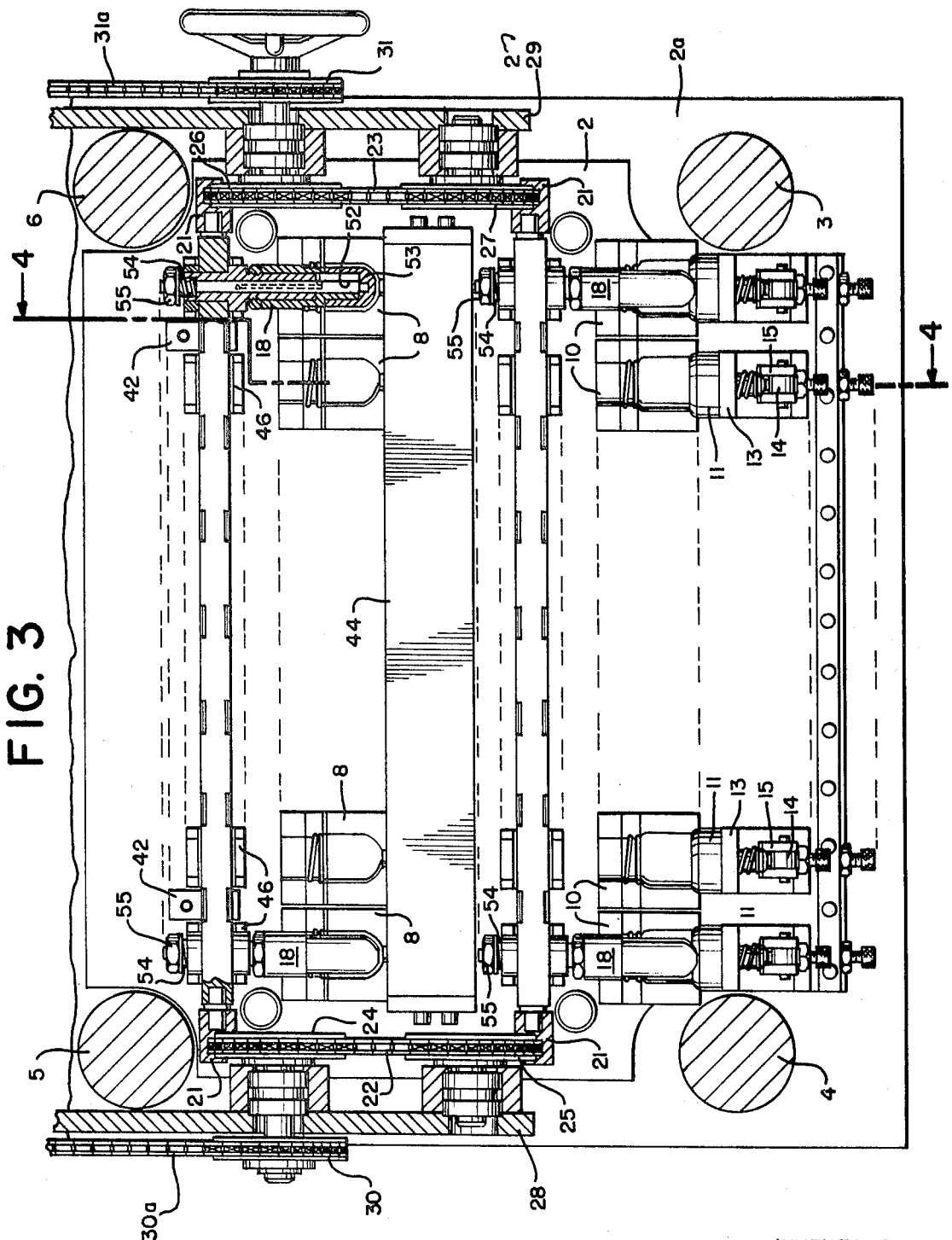
Figure 4:
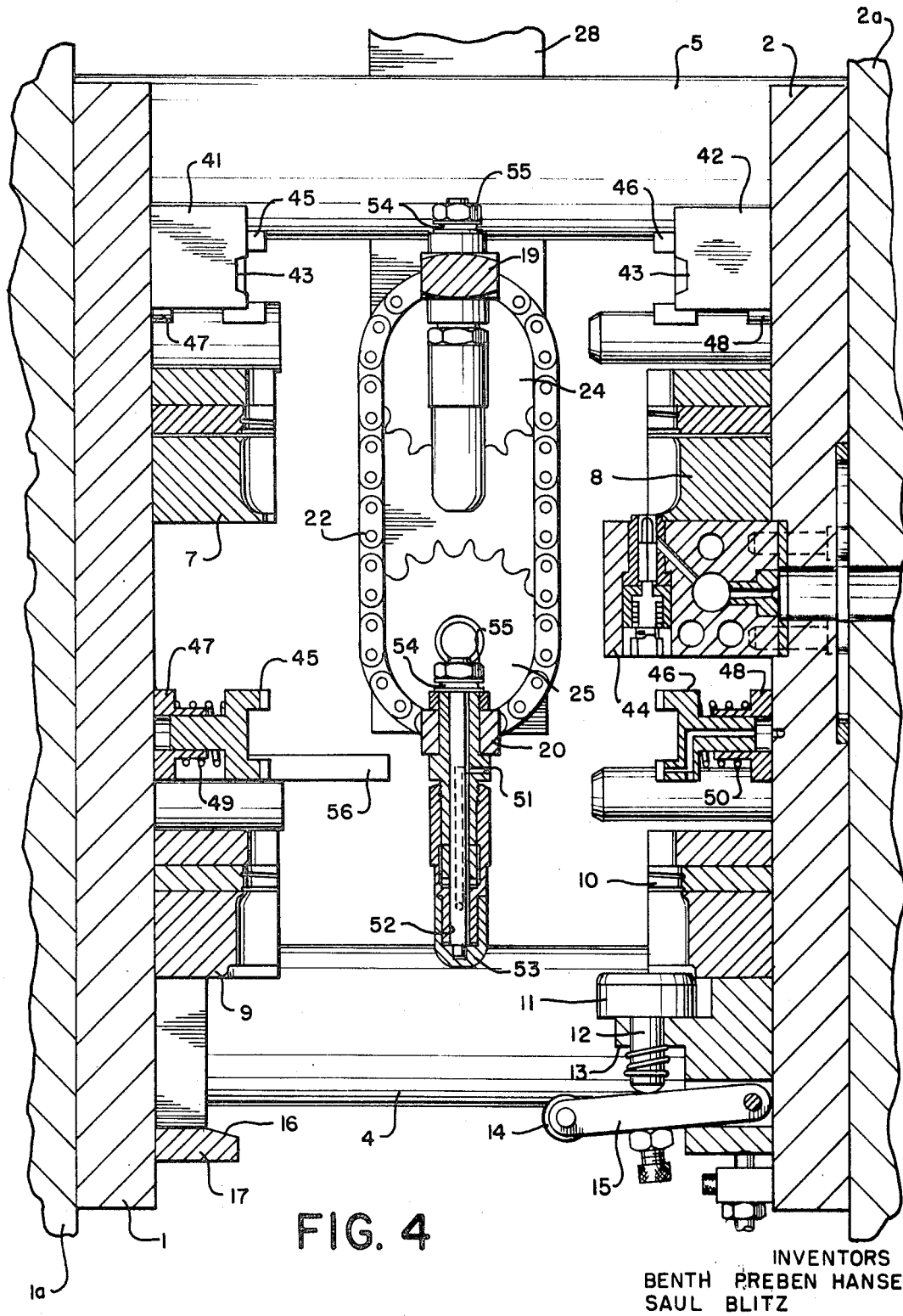
Figure 5:
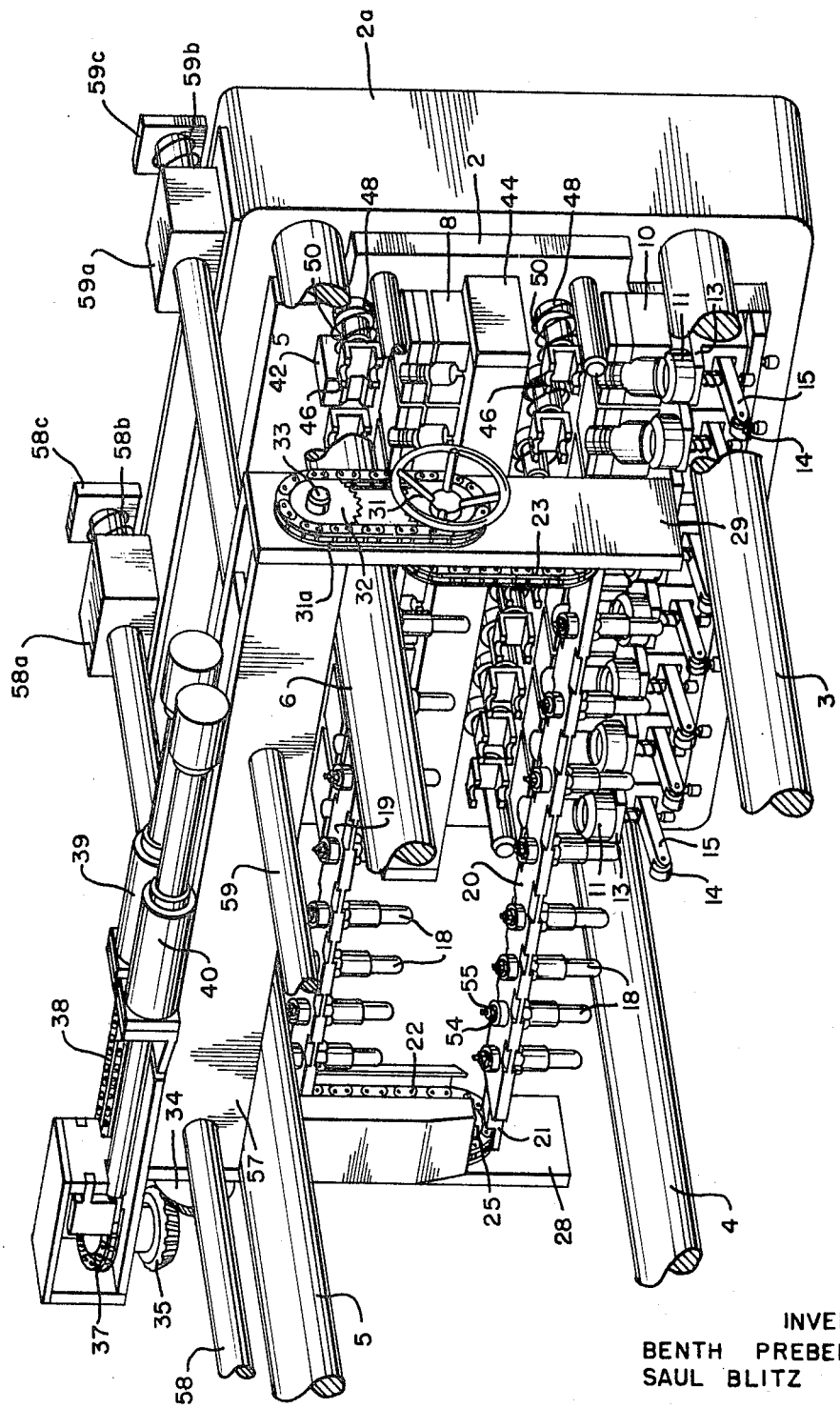

FIG. 1 shows a plan view of said portions,
FIGS. 2 and 3 show vertical sections along the line II—II in FIG. 1, FIG. 2 showing the upper part of the section and FIG. 3 the lower part of the section,
FIG. 4 shows a section along the line IV—IV in FIG. 3, and
FIG. 5 shows a perspective view of said portions, however some parts being omitted.

The said portions are placed on mounting plates 1 and 2 mounted on platens 1a and 2a of an injection moulding machine, that may be a conventional injection moulding machine or a machine constructed especially for the method in question. One of the platens and accordingly one of the mounting plates is fixedly placed on the machine, while the other platen can be moved towards the first mentioned platen, for instance by means of a hydraulic cylinder-piston mechanism. The movable platen is guided by four bars 3, 4, 5 and 6 having a circular cross section. In the embodiment shown the mounting plates are vertical. A number of injection mould halves 7 are secured to the mounting plate 1 in a horizontal row at the upper part thereof, and a number of corresponding injection mould halves 8 are secured to the mounting plate 2 at the same height in a horizontal row. The same number of blow-mould halves 9 are placed on the mounting plate 1 in a horizontal row at the lower part thereof, and the same number of blow-mould halves 10 are placed on the mounting plate 2 in a horizontal row at the same height.

The shown blow-mould halves are formed without a bottom portion, and a common mould bottom part 11 is placed on the mounting plate 2, said part being guided for vertical movement by means of a pin 12 in a member 13 that is secured to the mounting plate 2. The injection moulds and the blow-moulds are closed, when the movable mounting plate is moved towards the stationary mounting plate. By this movement a roller 14, mounted on an arm 15 journalled in a member 13, runs against an oblique surface 16 on a member 17 that is secured to the mounting plate 1, whereby the arm 15 presses the pin 12 and therefore the mould bottom part 11 upwards, whereby the blow-mould is closed from beneath. This is naturally the case with all the blow-moulds.

Furthermore, the injection moulds and the blow-moulds comprise cores 18, which are placed in rows on two barlike members 19 and 20. These bars are turnably placed at the ends on mountings 21 that are secured to chains 22 and 23, which are carried on sprocket wheels 24, 25, 26 and 27, said sprocket wheels being rotatably mounted in carrying means 28 and 29. The sprocket wheels 24 and 26 are arranged in driving connection with sprocket wheels 30 and 31, the last mentioned being connected by means of chains 30a, 31a with sprocket wheels 32 on the ends of a shaft 33. On this shaft there is a bevel gear 34 which engages a bevel gear 35 arranged on a vertical shaft 36 which is connected with a sprocket wheel 37 by means of a coupling or clutch means of the type that only causes bringing-along in the one direction. A chain 38 is carried by the sprocket wheel 37, said chain's two ends each being connected with a corresponding piston-cylinder mechanism 39 and 40. These mechanisms are adapted to move the chain 38 so much as, by means of the sprocket wheels 37, 35, 34, 32, 30, 31 and 24—27, to cause the chains 22 and 23 to move half a turn. The reciprocating movements of the two mechanisms cause, on account of the coupling between the shaft 36 and the sprocket wheel 37, the chains to turn a half turn for each movement, always in the same direction. The movement of the two mechanisms is synchronized with a mechanism not shown for movement of the movable mounting plate in such a way, that the movement of the chains 22 and 23 takes place when the two plates 1 and 2 have been drawn from each other, and the chains 22 and 23 stand still when the mounting plates are being moved towards each other.

When the chains 22 and 23 are in their stand-still position, the bars 19 and 20, shown in FIG. 4, are in the upper and lower position respectively and in the subsequent position the bar 19 is in the lower position and the bar 20 in the upper position.

When the movable mounting plate in the position shown is moved towards the stationary mounting plate, the cores 18 on the upper bar 19 will be clamped between the injection mould parts 7 and 8, as the parts 28 and 29, whereupon the cores 18 are supported, are displaceable in the same direction as said mounting plate. In order to ensure the correct position of the cores, guiding members 41 and 42 are fixedly placed on the mounting plates 1 and 2, said members having a recess 43 that engages correspondingly formed surfaces on the sides of the bar 19, respectively the bar 20. The cores 18 and the mould parts 7 and 8 are formed in such a way, that a space is formed between them. Beneath the mould parts 8 is placed a plastic-feeding block 44, in which conventional canals and valve means are formed for feeding plastic into the bottom of the closed injection mould 7, 8. Hereby a hollow article is formed which encases the core 18. When the mould parts 7 and 8 thereafter are moved away from each other, the hollow article will remain on the core 18.

When the movable mounting plate in the position shown is moved towards the stationary mounting plate, the cores 18 on the lower bar 20 will be clamped between the blow-mould parts 9 and 10, and the mould will be closed at the bottom by the part 11. In order to ensure the correct position of the cores during the closing, guiding means 45 and 46 are placed on the mounting plates 1 and 2, said means being placed movably on fixed parts 47 and 48 and being under influence of springs 49 and 50. These guiding means are arranged to engage and guide said bar 20 and keep it in the correct position. Through the guiding means 46 is formed a blowing canal that is connected with a source not shown for compressed air, said blowing canal being brought into tight connection, during the closing of the mould, with a side canal 51 in the core 18. This canal 51 is connected to a central canal 52. The core includes various parts as shown, and the lower part 53 is placed movably in a downward direction and is influenced by a spring 54 that seeks to pull it in an upward direction, said spring being adjustable by means of a nut 55. When compressed air is fed through the canal 52, the pressure will move the part 53 slightly downwards, whereby the air can flow out into a ringlike slit between the upper edge of the part 53 and the fixed portion of the core lying above the latter. This slit can for instance be slightly beneath the bottle neck portion of the mould, and the part of the plastic hollow article lying hereunder will hereby be pressed outwardly, so as to fill out the blow-mould. When the mould parts 9 and 10 thereafter are moved away from each other, the formed bottle will sit fixedly on the core 18, wherefrom it can be removed by the core being moved upwards by the chains 22 and 23 and by using a stripping member 56.

The parts 28 and 29 are interconnected by means of a bridge 57, whereon the cylinders 39 and 40 are fastened, said bridge being movable on round bars 58 and 59, whereby the whole structure that carries the cores 18, can be moved back and forth between the mounting plates. A special mechanism may be provided, that ensures that the whole structure always is in the centre position during the movements of the mounting plate, for instance comprising blocks 58a and 59a on the platens 1a and 2a, and springs 58b and 59b acting on said blocks 58a and 59a and on end members 58c and 59c on either end of said bars 58 and 59.

The shown and described embodiment is only to be considered as an exampleas various variations are possible within the scope of the invention. Thus a variation is possible, where the two sets of cores are not moved in closed paths, but are moved vertically up and down laterally offset to each other. However, this implies that during closing of the two sets of mould parts the two sets of cores are independently movable in the lateral direction, and maybe this can give constructive difficulties. The shown embodiment of the core with the lower portion 53, which is or can be brought into such a position that a circumferential air-discharge slit is formed that preferably is adjustable, is especially advantageous. The slit should be closed during the injection moulding as otherwise it is risked that the plastic is forced into the slit, and therefore it is especially advantageous that the portion 53 is movable between an injection moulding position and a blow-moulding position. In the embodiment shown the portion 53 is fastened to a bolt that extends downwards through the central canal 52, said portion having on its upper end the nut 55. It is also especially simple that the movement occurs by means of the air pressure against the spring influence, but other forms of control are also possible.

What I claim is:

1. A machine for producing hollow articles in pairs of injection mould halves mounted on opposite parallel mounting structures movable toward one another, and in similarly mounted pairs of blow-mould halves, said machine comprising at least one pair of rows of cores, each core of each row being positioned for insertion in one pair of injection mould halves and in the similarly mounted pair of blow-mould halves, and each row of cores being supported by a bar-like member which is parallel to the mounting structures, the bar-like members being secured to two chains between said mounting structures, and a driving mechanism for moving said chains intermittently to move the bar-like members so as to move each core from a position for insertion in one pair of mould halves to a position for insertion in another pair of mould halves in synchronism with the movement of the mounting structures in such a way that the bar-like members are stopped in their movement when the mounting structures and therewith the mould halves are being moved toward one another.

2. A machine according to claim 1, wherein the mounting structures are vertical and their movement is horizontal, the path of movement of the chains, bar-like members and cores is vertical, and the cores are suspended from the bar-like members.

3. A machine according to claim 1, wherein the mounting structures have guiding means for locking the bar-like members and the cores in position for said insertion before the closing of the mould halves.

References Cited

UNITED STATES PATENTS

| | | | |
|---|---|---|---|
| 2,853,736 | 9/1958 | Gossoni | 18—5 |
| 3,480,993 | 12/1969 | Schjeldahl et al. | 18—5 |

FOREIGN PATENTS

| | | | |
|---|---|---|---|
| 1,183,255 | 7/1959 | France | 18—5 |

J. SPENCER OVERHOLSER, Primary Examiner

M. O. SUTTON, Assistant Examiner